(12) United States Patent
Yan et al.

(10) Patent No.: US 9,793,800 B1
(45) Date of Patent: Oct. 17, 2017

(54) MULTIPHASE SWITCHING POWER SUPPLY WITH ROBUST CURRENT SENSING AND SHARED AMPLIFIER

(71) Applicant: Linear Technology Corporation, Milpitas, CA (US)

(72) Inventors: Yingyi Yan, Fremont, CA (US); Yi Ding Gu, Pleasanton, CA (US)

(73) Assignee: Linear Technology Corporation, Milpitas, CA (US)

( * ) Notice: Subject to any disclaimer, the term of this patent is extended or adjusted under 35 U.S.C. 154(b) by 0 days.

(21) Appl. No.: 15/479,162

(22) Filed: Apr. 4, 2017

Related U.S. Application Data

(60) Provisional application No. 62/323,490, filed on Apr. 15, 2016.

(51) Int. Cl.
| | | |
|---|---|---|
| *H02M 3/157* | (2006.01) | |
| *H02M 1/084* | (2006.01) | |
| *H02M 1/14* | (2006.01) | |
| *H02M 1/12* | (2006.01) | |
| *H02M 1/00* | (2006.01) | |

(52) U.S. Cl.
CPC .......... *H02M 3/157* (2013.01); *H02M 1/084* (2013.01); *H02M 1/12* (2013.01); *H02M 1/14* (2013.01); *H02M 2001/0009* (2013.01)

(58) Field of Classification Search
CPC ........ H02M 3/157; H02M 1/084; H02M 1/12; H02M 1/14; H02M 2001/0009
See application file for complete search history.

(56) References Cited

U.S. PATENT DOCUMENTS 8,823,352 B2 9/2014 Zhang
2004/0095119 A1* 5/2004 Kernahan ............. H02M 3/157
  323/282

* cited by examiner

*Primary Examiner* — Emily P Pham
(74) *Attorney, Agent, or Firm* — Patent Law Group LLP; Brian D. Ogonowsky

(57) ABSTRACT

In a multiphase, current mode controlled switching power supply, current through the inductors in the various phases is sensed to determine when to turn off the switching transistors. An AC current feedback path, sensing the ramping ripple current, is separate from the DC current path, sensing the lower frequency average current. A shared differential amplifier has its inputs multiplexed to receive only the DC component signals from all the phases. The gain of the amplifier is set so that the DC sense signal has the proper proportion to the AC sense signal. The output of the amplifier is sampled and held for each phase using a second multiplexer. The AC sense signal and the amplified DC sense signal, for each phase, are combined by a summing circuit. The composite sense signal is applied to a comparator for each phase to control the duty cycle of the associated switch.

8 Claims, 3 Drawing Sheets

MULTIPHASE SWITCHING POWER SUPPLY WITH ROBUST CURRENT SENSING AND SHARED AMPLIFIER

CROSS-REFERENCE TO RELATED APPLICATIONS

This application claims priority from U.S. provisional application Ser. No. 62/323,490, filed Apr. 15, 2016.

FIELD OF THE INVENTION

This invention relates to DC/DC converters and, in particular, to multiphase current mode switching converters.

BACKGROUND

Multiphase switching power supplies are well known and frequently used for high power applications. FIG. 1 illustrates a two-phase power supply. In such a multiphase power supply, a plurality of independently controlled switching power supplies are connected in parallel to drive a load, represented as a resistor RL, coupled to the regulated output voltage Vo. Typically, the controller 10 is implemented as an integrated circuit, and the inductors L1 and L2 and output capacitor Co are external. The switching transistors Q1-Q4 may be internal or external depending on the power requirements.

A clock sets each power supply during a different phase of a cycle by turning the top transistor Q1 or Q3 on at the beginning of its associated phase. In this way, the current conducted by each phase is only a fraction of the load current, and the output voltage ripple is reduced. This reduces the filtering requirements, reduces RMS power dissipation in the switches, reduces hot spots, enables more rapid response to load changes, and eases the requirements for traces on printed circuit boards and in integrated circuits. Ideally, the currents provided by the phases are the same under steady state conditions.

Current mode switching power supplies are commonly used in multiphase switching power supplies and require a very accurate current sensor to feed back the instantaneous inductor current to regulate the peak currents through the various inductors in the phases. Basically, when the ramping inductor current crosses a threshold voltage, the switching transistor is turned off for the remainder of the clock cycle. The current sensing should be identical for each phase to ensure the load current is balanced evenly across all the phases. FIG. 1 shows the current feedback signals Ifb1 and Ifb2 for each of the phases, and shows the output voltage feedback signal Vfb. The output voltage feedback signal Vfb may be a divided voltage.

One technique for detecting the inductor current in each phase is to insert a low value sense resistor (e.g., less than 0.1 ohm) in series with the inductor and measure the voltage drop across the resistor. The voltage drop includes a relatively large drop due to the DC component of the ramping inductor current and a much smaller drop due to the AC-ripple component of the ramping inductor current. Since the resistor in each phase has a very low value, there is a poor signal to noise ratio. The signal to noise problem is due to the relatively small ripple voltage (AC) drops across the sense resistor while the resistor is simultaneously conducting a high DC current and switching noise. Further, losses in the resistors waste power.

Instead of using a separate series resistor, current can be measured "losslessly" by sensing the voltage across the inductor (since the inductor has a DC winding resistance called DCR) or sensing the voltage across the synchronous rectifier switch (when it is turned on). This technique is considered lossless because it relies on resistive losses inherent in the converter topology.

Another way to effectively sense the current is to emulate the inductor current using a resistor-capacitor network across the inductor, where the time constant of the RC network is the same as the inductor-DCR time constant so that RC=L/DCR. Accordingly, the ramping voltage across the capacitor will track the ramping current through the inductor. However, if DCR is very low, there will be a switching noise problem and a signal to noise ratio problem. This will lead to pulse width modulation (PWM) phase jittering, current imbalances, and other issues.

U.S. Pat. No. 8,823,352 discloses various current sense techniques for a single-phase power supply, but does not address current sensing for a multiphase power supply. The '352 patent discloses a technique to separate out the AC and DC components of the inductor current, to effectively independently amplify the AC component, and then suitable amplify the DC component to have the proper proportion to the AC component. However, this technique has issues when applied to a multiphase power supply, since each phase would need a separate amplifier having exactly the same gain to similarly amplify its associated DC component, and it is difficult to form identical amplifiers for each of the phases. Providing the separate amplifiers also adds cost and size to the system.

What is needed is a multiphase switching power supply that uses current mode converter phases, where the current sensing for each phase can be made more accurate and identical for each phase.

SUMMARY

A multiphase switching power supply is disclosed having phased current mode converters (also referred to as phases). An RC network emulates the inductor current for each phase. The RC network separates out the DC and AC components of the emulated inductor current so the two paths can be separately processed, then later combined. The AC component can be made to have a high peak to peak voltage, since it is separated from the DC component, which improves the signal to noise ratio. The DC component is separately amplified. Accurate processing of the emulated inductor current for the phased current mode converters requires precisely the same amplification of the DC component for each phase.

Only a single differential amplifier for the DC component is used for all the phases since its inputs and output are multiplexed, and the output of the amplifier is applied to a sample and hold circuit for each phase. The output of the sample and hold circuit (containing the amplified DC component of the inductor current) is then summed with the AC component. The "input" multiplexer clock may be the same clock that sets the phases of the current mode converters, and the "output" multiplexer clock may be slightly delayed to avoid sampling switching noise in the amplifier output.

Therefore, the amplification is exactly the same for each phase, there is less switching noise due to the sample and hold of the DC component, and there is better current balancing by all the phases. Additionally, since there is only one amplifier, the cost and size of the system is reduced.

The sum of the AC component and the sample and held output of the amplifier, for each phase, is then compared to a control voltage for regulating the peak current through each of the inductors. All the phases will have the same control voltage, so the currents supplied by the phases should be the same.

The resistors in each of the current sensing circuits can be made to match and can be customized for the inductors in the different phases.

As a result, the current sensing for the various phased current mode converters will be more accurate and identical, with little added space since the same amplifier is used for all phases.

The current sensing and shared DC sense signal amplifier can be applied to any type of multiphase current mode converter including, buck, boost, buck-boost, valley current control, constant on-time control, constant off-time control, etc. All aspects of the converters may be conventional except for the current sensing and shared amplifier, enabling the invention to be easily incorporated in existing multiphase converter designs.

The various phases may use the same input voltage or different input voltages, and the phases may drive the same load or different loads. In all cases, the DC component of the inductor current will change slowly, enabling an average DC component in each phase to be sampled and used for the entire switching cycle.

BRIEF DESCRIPTION OF THE DRAWINGS

Elements that are the same or equivalent are labeled with the same numeral.

DETAILED DESCRIPTION

Figure 1:
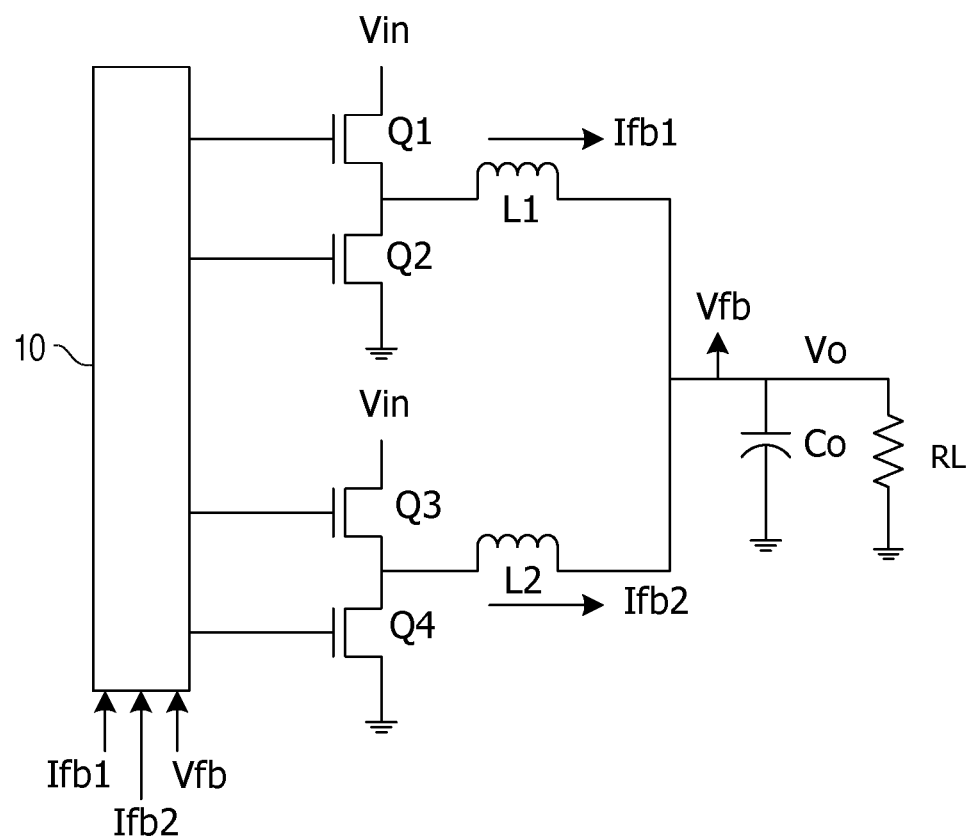
FIG. 1 illustrates a prior art generic multiphase switching power supply using current mode converters.
Figure 2:
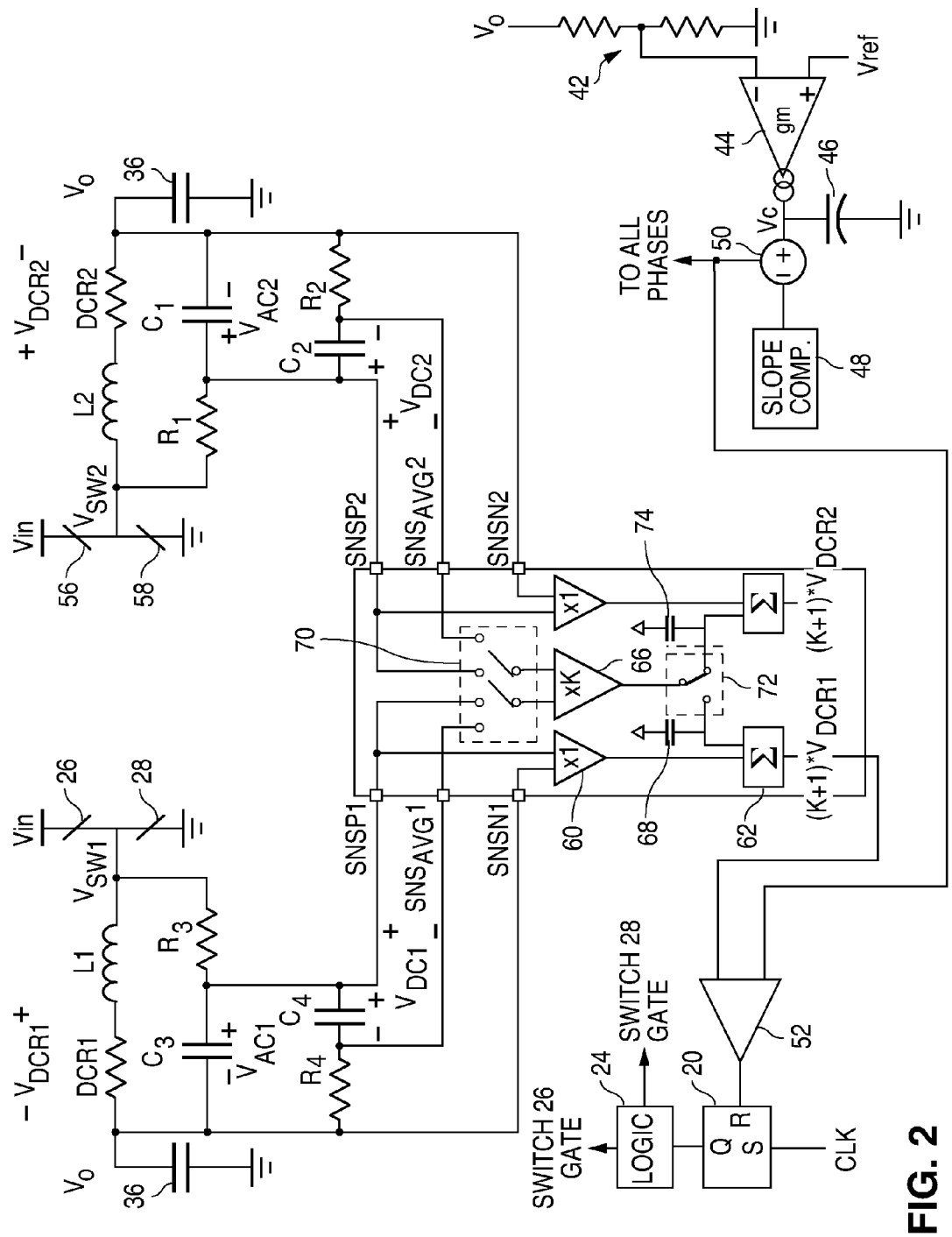
FIG. 2 illustrates an embodiment of the invention for a two-phase power supply, where the phased current mode converters each emulate their respective inductor current, separately process the AC and DC components of the emulated signal to improve the signal to noise ratio, use the same DC amplifier to process the DC component (by multiplexing), and use a sample and hold circuit to hold the DC amplified value throughout the clock cycle while the DC amplifier is intermittently coupled to each phase.

FIG. 2 illustrates a first embodiment of the invention, which is a multiphase switching power supply. Although only two phases are shown for simplicity, any number of phases may be used, depending on the required power and desired ripple. The operation of the conventional portion of the power supply will first be described. Many other types of power supplies may be used instead, and the invention is primarily related to the current sensing portion that generates separate AC and DC sense signals and the sharing of the DC sense amplifier by all the phases.

A clock (Clk) signal is applied to the set input of an RS flip flop 20. Each phase has its own clock signal, and the phases are equally divided over a single clock cycle. In the example of two phases, there is a half cycle difference between the phases. Generating phased clock signals is well known. The clock frequency will typically be between tens of kHz to a couple of MHz. Other types of multiphase current mode converters are not necessarily switched at a constant frequency, but inductor current detection is still required for controlling the switch.

The setting of the RS flip flop 20 generates a high signal at its Q output. A logic circuit 24, in response, turns transistor switch 26 on and turns the synchronous rectifier switch 28 off. Both switches may be MOSFETs or other transistors. A diode may replace the synchronous rectifier switch 28. The logic circuit 24 ensures that there is no cross-conduction of switches 26 and 28. The input voltage Vin applied to an inductor L1 through the switch 26 causes a ramping current to flow through the inductor L1. The ramping current is filtered by an output capacitor 36 and supplies current to a load connected to the output voltage Vo. The output capacitor 36 is relatively large to smooth out ripple.

The output voltage Vo is applied to a voltage divider 42, and the divided voltage is applied to the negative input of a transconductance error amplifier 44. A reference voltage Vref is applied to the positive input of the amplifier 44. The output current of the amplifier 44 corresponds to the difference between the actual output voltage Vo and the desired output voltage. The voltage (a control voltage Vc) across a capacitor 46 at the output of the amplifier 44 is adjusted up or down based on the positive or negative current output of the amplifier 44. The control voltage Vc at the capacitor 46, among other things, sets the duty cycle of the switch 26, and the level of the control voltage Vc is that needed to equalize the inputs into the amplifier 44. A resistor and capacitor may be connected in parallel with the capacitor 46 for controlling and optimizing the phase and loop stability, as is well known.

FIG. 2 also illustrates a conventional slope compensation circuit 48, as is well known for current mode power converters. A sawtooth output of the slope compensation circuit 48 is subtracted from the control voltage Vc by a subtractor 50. At high duty cycles (typically greater than 50%), the effect of the slope compensation circuit 48 is to reduce sub-harmonic oscillations that may occur in the current loop at the high duty cycles. The slope compensation circuit 48 is unrelated to the present invention. Slope compensation is not needed for certain types of multiphase current mode converters.

The compensated control voltage Vc is applied to one input of a comparator 52.

As will be described in more detail later, an emulated signal representing the instantaneous ramping inductor current is applied to the other input of the comparator 52. When the ramping signal crosses the compensated control voltage Vc, the RS flip flop 20 is reset, which turns off the switch 26 and turns on the switch 28 for discharging the inductor, until the start of the next clock cycle. In this way, the peak current through the inductor L1 for each cycle is regulated to generate a desired output voltage Vo. Other types of suitable current mode converters do not regulate peak current but still switch the transistor based on the detected inductor current.

The other phase is identical to the phase just described and uses its own comparator (not shown), RS flip flop, and logic to independently switch its switches 56 and 58. All phases use the same compensated control voltage Vc for setting the peak current through their inductor. Ideally, each phase has the same duty cycle and supplies one-half the total current to the load. Although each phase is shown driving a separate output capacitor 36, they are the same common capacitor 36.

The current through the inductor L1 includes a DC component (the lower frequency, average current) and an AC component (the higher frequency, ripple current).

In prior art designs, switching noise (e.g., high frequency spikes and oscillations) in the inductor current, by the turning on or off of the various switches, is a problem and, if high enough, can cause false triggering of the comparator, resulting in jitter and an increase of ripple on the output voltage Vo.

The present invention mitigates the problem with switching noise and helps all phases to have identical characteristics so that each phase will supply the same proportion of current to the load. This avoids one phase from conducting more current, causing it to get hotter than other phases, lower its efficiency, and limit the maximum operation ambient temperature. Keeping the phases identical also reduces output voltage ripple. The present invention uses a multiplexed differential amplifier that is shared by all phases, which reduces the size of the phased converter and causes all phases to have more similar operating characteristics.

FIG. 2 illustrates the current sense circuit having different RC circuits for an AC sense path and a DC sense path. The resistance DCR1 represents the inductor winding DC resistance. An inductor winding may have a DC resistance on the order of a few mohms to less than 1 mohm. An RC network, comprising the series connection of a resistor R3 and capacitor C3, Kelvin connected across the inductor L1 is selected to have a time constant much less than that of the inductor and DCR so that R3*C3<L1/DCR. The AC ripple voltage is sensed across the capacitor C3 terminals. The R3*C3 time constant may be any time constant below L1/DCR for proper operation, since the gain of the DC path will be suitably adjusted to avoid distortion. By lowering the time constant of R3*C3, the AC ripple voltage magnitude across capacitor C3 can be greatly increased as the current through the inductor L1 ramps up. This increased voltage signal increases the signal to noise ratio of the AC sense signal, making triggering of the comparator 52 more accurately timed.

Since any switching noise contains frequencies much greater than the switching frequency, much of the switching noise will be filtered out by the capacitor C3, so the reduction of the time constant of R3*C3 does not adversely impact the effect of switching noise in the AC path.

A second RC network is formed by the series connection of resistor R4 and capacitor C4 across the capacitor C3. Resistor R4 and capacitor C4 act as a low pass filter, to filter out the switching noise and AC ripple, where the filtered signal across the capacitor C4 is proportional to the DC component of the inductor current. The voltage across capacitor C4 is the average voltage across the capacitor C3.

The voltage across the sense terminals SNSP1 and $SNS_{AVG}1$ represents the DC component $V_{DC1}$ of the inductor current, and the voltage across the sense terminals SNSP1 and SNSN1 represents the AC ripple voltage $V_{AC1}$ of the inductor current.

The AC ripple voltage is buffered by a unity gain buffer 60 for each phase, and the output of the buffer 60 is applied to a summer 62 for each phase.

The DC component of the inductor current is relatively constant during steady state operation, so its instantaneous value during a switching cycle is not important. Therefore, the DC component for a phase can be amplified by a shared differential amplifier 66 and sampled by a sample and hold circuit 68 only once per cycle at a time after switching noise has subsided. The amount of amplification is set to cause the DC sense signal to have the proper proportion to the AC sense signal for no distortion. The required amplification gain K can be determined by simulation.

The summer 62 adds the AC and DC sense signals to generate a signal that emulates the actual inductor current. The output of the summer 62 will be $(K+1)*V_{DCR1}$.

Since the same amplifier 66 is used by each phase, the DC component for each phase is amplified by exactly the same gain. This is accomplished by multiplexing the DC sense inputs from all the phases so that they are applied in sequence to the amplifier 66. This also reduces the size of the controller by only requiring one amplifier 66.

A first multiplexer 70 is controlled by the various clock phases to sequentially connect each phase to the amplifier 66 for a brief moment.

A second multiplexer 72 is controlled by the clock phases to sample and hold the output of the amplifier 66 at a time shortly after the first multiplexer 70 has connected the amplifier 66 to the associated phase to eliminate any switching noise. A hold capacitor 74 for each phase holds the amplified DC sense signal for the remainder of the clock cycle for that phase. The sampled and held signals are applied to the phase's associated summer 62 for virtually the entire clock cycle for that phase so that the output of the summer 62 for that phase accurately represents the inductor current over the clock cycle.

The emulated inductor current signals for the various phases are then applied to the associated comparators 52 for the phases and compared to the common compensated control voltage Vc to determine when to turn of the power switch (e.g., switch 26 or 56) for the associated phase.

As a result of the circuitry in FIG. 2, switching noise is virtually eliminated from the feedback path, the phases are made more similar due to the shared amplifier 66, and signal to noise ratio is greatly increased. This results in more precise current balancing, smaller duty cycler jittering, a lower cost control IC, and a more accurate and constant output voltage Vo.

Further, the comparator 52 and the buffer 60 of each phase both have inevitable offset as a result of fabrication variances. The offsets of each phase are inevitably different in practice. The mismatch offset contributes to the current imbalance between phases. Now, with the inventive improvement, as the DC and AC sense signals are both effectively amplified by K times, the imbalance due to these mismatch offsets is reduced by a factor of 1/K.

If the controller IC used the prior art technique of N different amplifiers for N phases, the inevitable mismatch between these amplifiers' gains K would contribute to the current imbalance. Now, with the inventive method, every phase uses the same amplifier, so the gains K are exactly the same. This contributing factor of current imbalance is eliminated.

The corner of the low pass filter, comprising the resistor R4 and capacitor C4, is ideally designed so that the summed signal is proportional to the voltage signal across the DCR1 at any frequency without phase shift. Also, it is preferred that the resistors R3 and R4 have values that cause the voltages across these two resistors to be equal.

The circuit only has one Kelvin connection to the inductor, simplifying implementation.

The other phase of the power supply is identical to the first phase and includes resistors R1 and R2, capacitors C1 and C2, inductor L2, and the AC and DC component processing circuitry. The AC ripple voltage and DC sense voltage are applied to the terminals SNSP2, SNSN2 and $SNS_{AVG2}$. The DC sense voltage is labeled $V_{DC2}$. Any additional phases would also be identical.

Figure 3:
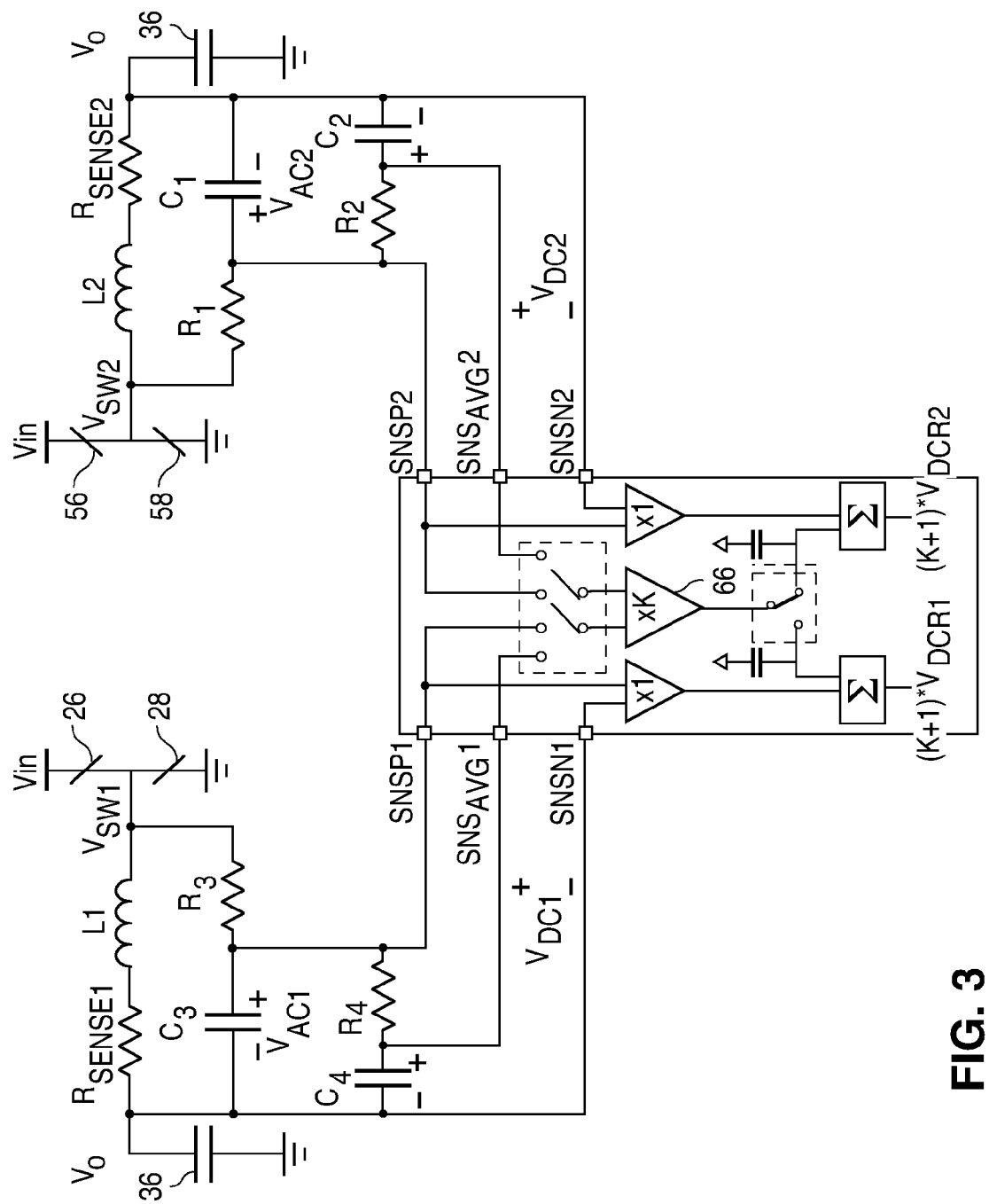
FIG. 3 illustrates another embodiment of the invention where a low value sense resistor is used in the inductor current path, rather than only using the inductor's DCR, to drop a voltage. This may provide more consistent current readings across all phases.

FIG. 3 is similar to FIG. 2 but a low value sense resistor Rsense is used to detect the DC component of the inductor current rather than the average voltage across the capacitor C3. The voltage drop across the resistor Rsense is filtered by the low pass filter, comprising the resistor R4 and capacitor C4, and the voltage across the capacitor C4 is the DC component of the inductor current to be applied to the amplifier 66. The RC time constant of resistor R3 and capacitor C3 is lower than the L1/(DCR1+Rsense) time constant. The remainder of the circuitry and operation is the same as in FIG. 2.

The current sensing and shared DC sense signal amplifier can be applied to any type of multiphase current mode converter including, buck, boost, buck-boost, valley current control, constant on-time control, constant off-time control, etc.

Some multiphase converters do not use a common phased clock to set the switching transistor, but use frequency modulation, where the switching frequency for all the phases is independent and controlled to cause the converter to output the regulated voltage. Such types of converters are still referred to as multiphase converters since the switches do not all switch at the same time.

All aspects of the converters may be conventional except for the current sensing and shared amplifier, enabling the invention to be easily incorporated in existing multiphase converter designs.

The various phases may use the same input voltage or different input voltages, and the phases may drive the same load or different loads. In all cases, the DC component of the inductor current will change slowly, enabling an average DC component in each phase to be sampled and used for the entire switching cycle.

All phases may be controlled by the same controller IC incorporating the present invention.

While particular embodiments of the present invention have been shown and described, it will be obvious to those skilled in the art that changes and modifications may be made without departing from this invention in its broader aspects and, therefore, the appended claims are to encompass within their scope all such changes and modifications that are within the true spirit and scope of this invention.

What is claimed is:

1. A multiphase switching power supply comprising:
   a first power supply portion switching at a first phase,
      wherein the first power supply portion comprises a first inductor and a first current detection circuit for generating a first voltage signal corresponding to a first AC component of current through the first inductor and for generating a second voltage signal corresponding to a first DC component of current through the first inductor,
      wherein the first power supply portion further comprises a first summing circuit for summing the first voltage signal and the second voltage signal to create a composite first current sense signal corresponding to a current through the first inductor;
   a second power supply portion, substantially identical to the first power supply portion, switching at a second phase, different from the first phase,
      wherein the second power supply portion comprises a second inductor and a second current detection circuit for generating a third voltage signal corresponding to a second AC component of current through the second inductor and generating a fourth voltage signal corresponding to a second DC component of current through the second inductor,
      wherein the second power supply portion further comprises a second summing circuit for summing the third voltage signal and the fourth voltage signal to create a composite second current sense signal corresponding to a current through the second inductor;
   a differential amplifier,
      wherein the first current detection circuit and the second current detection circuit share the differential amplifier, wherein the differential amplifier has a gain for amplifying a fifth voltage signal in the first current detection circuit, to generate the second voltage signal corresponding to the first DC component of current through the first inductor, and for similarly amplifying a sixth voltage signal in the second current detection circuit, to generate the fourth voltage signal corresponding to the second DC component of current through the second inductor;
   a first multiplexer having inputs coupled to the first power supply portion and the second power supply portion to receive the fifth voltage signal and the sixth voltage signal and having an output coupled to inputs of the differential amplifier, the first multiplexer coupling the fifth voltage signal to the inputs of the differential amplifier during a switching cycle of the first power supply portion, and the first multiplexer coupling the sixth voltage signal to the inputs of the differential amplifier during a switching cycle of the second power supply portion;
   a first sample and hold circuit sampling and holding the second voltage signal output from the differential amplifier, corresponding to the first DC component of current through the first inductor, during the switching cycle of the first power supply portion, an output of the first sample and hold circuit being connected to an input of the first summing circuit;
   a second sample and hold circuit sampling and holding the fourth voltage signal output from the differential amplifier corresponding to the second DC component of current through the second inductor, during the switching cycle of the second power supply portion, an output of the second sample and hold circuit being connected to an input of the second summing circuit; and
   a second multiplexer having an input coupled to the output of the differential amplifier, the second multiplexer connecting the output of the differential amplifier to the first sample and hold circuit during the switching cycle of the first power supply portion and connecting the output of the differential amplifier to the second sample and hold circuit during the switching cycle of second power supply portion.

2. The power supply of claim 1,
   wherein the first power supply portion comprises:
      a first switch switching at the first phase, the first switch having a first input terminal for coupling to an input voltage;
      the first inductor having a first terminal coupled to the first switch so as to conduct current during an on-time of the first switch, current through the first inductor ramping up during an on-time of the first switch, current through the first inductor having the low frequency first DC component and the higher frequency first AC component;
      a first comparator comparing the composite first current sense signal, corresponding to the current through the first inductor, to a control voltage corresponding to an output voltage of the power supply, an output of the first comparator controlling a duty-cycle of the first switch to generate a regulated output voltage of the power supply; and a first flip-flop receiving the output of the first comparator and a first clock signal, an output of the first flip-flop controlling when to turn on and turn off the first switch, the first clock signal determining when to turn on the first switch, and the output of the first comparator determining when to turn off the first switch;

wherein the second power supply portion comprises:

a second switch switching at the second phase, the second switch having a second input terminal for coupling to the input voltage;

the second inductor having a second terminal coupled to the second switch so as to conduct current during an on-time of the second switch, current through the second inductor ramping up during an on-time of the second switch, current through the second inductor having the low frequency second DC component and the higher frequency second AC component;

a second comparator comparing the composite second current sense signal, corresponding to the current through the second inductor, to the control voltage corresponding to the output voltage of the power supply, an output of the second comparator controlling a duty-cycle of the second switch to generate the regulated output voltage of the power supply; and a second flip-flop receiving the output of the second comparator and a second clock signal, wherein a phase of the second clock signal is different from a phase of the first clock signal, an output of the second flip-flop controlling when to turn on and turn off the second switch, the second clock signal determining when to turn on the second switch, and the output of the second comparator determining when to turn off the second switch.

3. The power supply of claim 1 wherein the first inductor has a first winding having a first DC resistance (DCR1) and an inductance of L1, wherein L1/DCR1 is a first time constant, wherein the first current detection circuit comprises:

a first resistor, having a resistance of R1, in series with a first capacitor, having a capacitance of C1, connected at least across the first inductor, wherein R1*C1 is a second time constant less than the first time constant; and a second resistor in series with a second capacitor connected across the first capacitor, wherein the second resistor and the second capacitor form a low pass filter for passing only a DC component for application to the first multiplexer.

4. The power supply of claim 1 further comprising a sense resistor, with resistance R1, connected in series with the first inductor, wherein the first inductor has a first winding having a first DC resistance (DCR1) and an inductance of L1, wherein L1/(DCR1+R1) is a first time constant, wherein the first current detection circuit comprises:

a first resistor, having a resistance of R1, in series with a first capacitor, having a capacitance of C1, connected at least across the first inductor and sense resistor, wherein R1*C1 is a second time constant less than the first time constant; and a second resistor in series with a second capacitor connected across the sense resistor, wherein the second resistor and the second capacitor form a low pass filter for passing only a DC component for application to the first multiplexer.

5. The power supply of claim 1 wherein the first power supply portion switches a first switch, and wherein the second power supply portion switches a second switch, the multiphase switching power supply further comprising a clock generator for switching the first switch and the second switch at the same frequency.

6. The power supply of claim 1 wherein the first power supply portion and the second power supply portion are coupled to receive the same input voltage.

7. The power supply of claim 1 wherein the first power supply portion and the second power supply portion are coupled to output the same output voltage.

8. The power supply of claim 1 wherein the first power supply portion and the second power supply portion are coupled to the same load.

* * * * *